(12) United States Patent
Shaffer et al.

(10) Patent No.: US 8,045,998 B2
(45) Date of Patent: Oct. 25, 2011

(54) METHOD AND SYSTEM FOR COMMUNICATING USING POSITION INFORMATION

(75) Inventors: Shmuel Shaffer, Palo Alto, CA (US); Shah Talukder, Los Gatos, CA (US); Dean M. Zanone, Norco, CA (US); Yogesh Kalley, Sunnyvale, CA (US); Kittur V. Nagesh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/149,041

(22) Filed: Jun. 8, 2005

(65) Prior Publication Data

US 2006/0281471 A1 Dec. 14, 2006

(51) Int. Cl.
*H04W 24/00* (2009.01)

(52) U.S. Cl. ............... 455/456.2; 455/456.1; 455/456.5; 455/456.6; 455/553.1; 340/988; 340/996

(58) Field of Classification Search ............... 455/456.1, 455/456.5, 456.2, 456.3, 456.6, 452.1, 452.2, 455/553.1; 340/988, 996
See application file for complete search history.

(56) References Cited

U.S. PATENT DOCUMENTS

| | | | |
|---|---|---|---|
| 4,359,603 A | 11/1982 | Heaton | 370/267 |
| 4,730,306 A | 3/1988 | Uchida | 370/263 |
| 4,746,924 A | 5/1988 | Lightfoot | |
| 5,048,082 A | 9/1991 | Krafft | 379/389 |
| 5,099,510 A | 3/1992 | Blinken et al. | 379/202.01 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,204,844 B1 * | 3/2001 | Fumarolo et al. | 715/736 |
| 6,233,315 B1 | 5/2001 | Reformato et al. | 379/88.01 |
| 6,327,567 B1 | 12/2001 | Willehadson et al. | 704/270 |
| 6,374,100 B1 | 4/2002 | Smith et al. | 455/419 |
| 6,400,816 B1 | 6/2002 | Hjalmtysson et al. | 379/201 |
| 6,404,873 B1 | 6/2002 | Beyda et al. | 379/202.01 |

(Continued)

FOREIGN PATENT DOCUMENTS

CN  2674799 Y  1/2005

(Continued)

OTHER PUBLICATIONS

NetworkFirst Interoperability Solved, Data Sheet, M/A-COM, Inc., ECR-7018A, http://www.networkfirst.com/resources/pdf/NetworkFirstRevised5_03.pdf, 6 pages.

(Continued)

*Primary Examiner* — Ajit Patel
*Assistant Examiner* — Khai M Nguyen
(74) *Attorney, Agent, or Firm* — Baker Botts L.L.P.

(57) ABSTRACT

A method for communicating using position information includes communicating on a first communication network at a first location using one or more first communication parameters of the first communication network and, upon moving from the first location to a second location, receiving position information identifying the second location. The method includes adjusting the one or more first communication parameters to one or more second communication parameters based on the second location and communicating on a second communication network at the second location using the one or more second communication parameters.

29 Claims, 3 Drawing Sheets

U.S. PATENT DOCUMENTS

| | | | |
|---|---|---|---|
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,501,767 B1* | 12/2002 | Inoue et al. | 370/465 |
| 6,608,820 B1 | 8/2003 | Bradshaw | 370/260 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 7,089,005 B2 | 8/2006 | Reddy | |
| 2001/0028321 A1 | 10/2001 | Krasner | 342/357.1 |
| 2002/0013813 A1 | 1/2002 | Matsuoka | 709/204 |
| 2002/0118796 A1 | 8/2002 | Menard et al. | 379/45 |
| 2002/0152305 A1 | 10/2002 | Jackson et al. | 709/224 |
| 2002/0178364 A1* | 11/2002 | Weiss | 713/182 |
| 2003/0100326 A1 | 5/2003 | Grube et al. | 455/515 |
| 2004/0054428 A1 | 3/2004 | Sheha et al. | 700/56 |
| 2004/0070515 A1 | 4/2004 | Burkley et al. | 340/825.49 |
| 2004/0139320 A1* | 7/2004 | Shinohara | 713/168 |
| 2004/0160458 A1 | 8/2004 | Igarashi et al. | 345/660 |
| 2004/0185863 A1* | 9/2004 | Ogami | 455/452.1 |
| 2004/0192353 A1* | 9/2004 | Mason et al. | 455/457 |
| 2004/0249949 A1 | 12/2004 | Gourraud et al. | 709/227 |
| 2005/0048987 A1 | 3/2005 | Glass | |
| 2005/0135348 A1 | 6/2005 | Staack | 370/353 |
| 2005/0174991 A1 | 8/2005 | Keagy | 370/352 |
| 2005/0195774 A1* | 9/2005 | Chennikara et al. | 370/338 |
| 2005/0232207 A1 | 10/2005 | Antoniadis et al. | 370/338 |
| 2005/0265256 A1 | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1* | 7/2006 | Dua | 370/352 |
| 2007/0030144 A1 | 2/2007 | Titus et al. | 340/534 |
| 2007/0047479 A1 | 3/2007 | Shaffer et al. | 370/328 |
| 2007/0060144 A1 | 3/2007 | Mills et al. | 455/445 |
| 2007/0104121 A1 | 5/2007 | Shaffer et al. | 370/276 |
| 2007/0105578 A1 | 5/2007 | Shaffer et al. | 455/518 |
| 2007/0105579 A1 | 5/2007 | Shaffer et al. | 455/519 |
| 2007/0115848 A1 | 5/2007 | Chean et al. | 370/252 |
| 2007/0274611 A1 | 11/2007 | Rodriguez et al. | |
| 2008/0037461 A1 | 2/2008 | Biltz et al. | 370/328 |
| 2008/0167049 A1* | 7/2008 | Karr et al. | 455/456.2 |

FOREIGN PATENT DOCUMENTS

| | | |
|---|---|---|
| WO | WO 01/91485 | 11/2001 |
| WO | WO 02/074051 | 9/2002 |

OTHER PUBLICATIONS

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

Interoperability Gateway, OpenSky, NetworkFirst, P25$^{IP}$, Data Sheet, M/A-COM, Inc. ECR-7054, http://www.opensky.com/network/7054.pdf, 2 pages.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us english/jsp/explore/onstar_basics/technology.jsp, 3 pages, 2005.

Cisco IP Interoperability and Collaboration System, Q&A, Copyright © Cisco Systems, Inc. www.cisco.com, 4 pages. Printed Mar. 2006.

Cisco IPICS, Solution Overview, Copyright © Cisco Systems, Inc., www.cisco.com/go/ipics, 6 pages. Printed Mar. 2006.

Matthews, et al., *A New Interoperability Paradigm A Concept Proposal*, Mar. 2006, Worcester Polytechnic Institute, WPI Bioengineering Institute (Mar. 2006), 15 pages, Mar. 2006.

PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).

PCT International Search Report and Written Opinion (ISA/US) for PCT/US06/19227; 7 pages, Sep. 4, 2007.

PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).

Shaffer, et al., U.S. Appl. No. 11/550,234, filed Oct. 17, 2006, *Method and System for Providing an Indication of a Communication*.

Shaffer, et al., U.S. Appl. No. 11/201,832, filed Aug. 10, 2005, *Method and System for Automatic Configuration of Virtual Talk Groups Based on Location of Media Source*.

Shaffer, et al., U.S. Appl. No. 11/202,400, filed Aug. 10, 2005, *Method and System for Communicating Media Based on Location of Media Source*.

Shaffer, et al., U.S. Appl. No. 11/202,403, filed Aug. 10, 2005, *Method and System for Providing Interoperable Communications with Location Information*.

Shaffer, et al., U.S. Appl. No. 11/214,582, filed Aug. 29, 2005, *Method and System for Conveying Source Location Information*.

Shaffer, et al., U.S. Appl. No. 11/364,146, filed Feb. 27, 2006, *Method and System for Providing Interoperable Communication with Congestion Management*.

Shaffer, et al., U.S. Appl. No. 11/365,113, filed Feb. 28, 2006, *Method and System for Providing Interoperable Communication with Dynamic Event Area Allocation*.

Shaffer, et al., U.S. Appl. No. 11/399,031, filed Apr. 5, 2006, *Method and System for Managing Virtual Talk Groups*.

Shaffer, et al., U.S. Appl. No. 11/382,496, filed May 10, 2006, *Providing Multiple Virtual Talk Group Communication Sessions*.

Kalley, et al., U.S. Appl. No. 11/383,998, filed May 18, 2006, *Providing Virtual Talk Group Communication Sessions in Accordance with Endpoint Resources*.

Shaffer, et al., U.S. Appl. No. 11/421,994, filed Jun. 2, 2006, *Method and System for Joining a Virtual Talk Group*.

Shaffer, et al., U.S. Appl. No. 11/421,999, filed Jun. 2, 2006, *Method and System for Managing a Plurality of Virtual Talk Groups*.

Shaffer, et al., U.S. Appl. No. 11/617,019, filed Dec. 28, 2006, *Method and System for Providing Congestion Management within a Virtual Talk Group*.

Shaffer, et al., U.S. Appl. No. 11/746,960, filed May 10, 2007, *Method and System for Handling Dynamic Incidents*.

Jim McKay, *Government Technology*, "Intact Amid Chaos", Mar. 2005, 2 pages.
Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.
MRT Urgent Communications: Service, Safety, Security, "5 for '05 Technologies," Dec. 1, 2004, 9 pages. http://mrtmag.com/mag/radio_technologies.
MRT Urgent Communications: Service, Safety, Security, John Facella, "ROIP Success Is in the Details," Dec. 1, 2004, 3 pages. http://mrtmag.com/mag/radio_roip_success_details/.
Ann Imse, *Rocky Mountain News*, "Radio Breakthrough for Cops, Firefighters," Dec. 10, 2004, 2 pgs.
*First Responder Communications*, A Supplement to MRT and Fire Chief, "IP Opens Eyes," Aug. 2004, 5 pages.
*MRT, Mobile Radio Technology*, "IP Evangelist," Apr. 2004, 4 pages, www.iwce-mrt.com.
Ron Bender, et al., *MRT; Mobile Radio Technology* "Multiple Choices for Critical Communications," Oct. 2001, 4 pages, www.mrtmag.com.
Jay Herther, et al., *MRT; Mobile Radio Technology*, "Voice-over-Interintranet Protocol for Critical Communications," Aug. 2001, 4 pages, www.mrtmag.com.
*What's New in Radio Communications*, Aug./Sep. 2001, vol. 14 No. 1, Inside: Marine Radio, 2 pages, www.westwick-farrow.com.au.
Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.
Shaffer et al., U.S. Appl. No. 11/201,832, filed Aug. 10, 2005, Communication from the U.S. Patent and Trademark Office mailed Sep. 28, 2007.
Shaffer et al., U.S. Appl. No. 11/201,832, filed Aug. 10, 2005, Communication from the U.S. Patent and Trademark Office mailed Apr. 1, 2008.
Shaffer et al., U.S. Appl. No. 11/202,400, filed Jun. 8, 2005, Communication from the U.S. Patent and Trademark Office mailed Jul. 31, 2007.
Shaffer et al., U.S. Appl. No. 11/202,400, filed Jun. 8, 2005, Communication from the U.S. Patent and Trademark Office mailed Apr. 25, 2008.
Shaffer et al., U.S. Appl. No. 11/202,400, filed Jun. 8, 2005, Communication from the U.S. Patent and Trademark Office mailed Mar. 9, 2009.
Shaffer et al., U.S. Appl. No. 11/365,113, filed Feb. 28, 2006, Communication from the U.S. Patent and Trademark Office mailed Feb. 3, 2009.
Shaffer et al., U.S. Appl. No. 11/202,403, filed Jun. 8, 2005, Communication from the U.S. Patent and Trademark Office mailed Sep. 28, 2007.
Shaffer et al., U.S. Appl. No. 11/202,403, filed Jun. 8, 2005, Communication from the U.S. Patent and Trademark Office mailed Apr. 1, 2008.
Shaffer et al., U.S. Appl. No. 11/214,582, filed Aug. 29, 2005, Communication from the U.S. Patent and Trademark Office mailed Oct. 22, 2007.
Shaffer et al., U.S. Appl. No. 11/214,582, filed Aug. 29, 2005, Communication from the U.S. Patent and Trademark Office mailed Mar. 28, 2008.
Shaffer et al., U.S. Appl. No. 11/214,582, filed Aug. 29, 2005, Communication from the U.S. Patent and Trademark Office mailed Sep. 16, 2008.
Shaffer et al., U.S. Appl. No. 11/214,582, filed Aug. 29, 2005, Communication from the U.S. Patent and Trademark Office mailed Mar. 16, 2009.
Shaffer et al., U.S. Appl. No. 11/365,113, filed. Feb. 28, 2006, Communication from the U.S. Patent and Trademark Office mailed Dec. 21, 2010, Jan. 21, 2010.
Shaffer et al., U.S. Appl. No. 11/365,113, filed Feb. 28, 2006, Communication from the U.S. Patent and Trademark Office mailed Jul. 29, 2009.
Shaffer et al., U.S. Appl. No. 11/214,582, filed Aug. 29, 2005, Communication from the U.S. Patent and Trademark Office mailed Sep. 1, 2009.
Text of the First Office Action from IP Office of People's. Republic of China for Application No. 200680014772.3 (3 pages), May 27, 2010.
Shaffer et al., U.S. Appl. No. 11/214,582, Final Office Action from the United States Patent and Trademark Office mailed Apr. 27, 2010.
Second Office Action from the Patent Office of the People's Republic of China; for Application No. 200680014772.4, Nov. 25, 2010.
Shaffer et al., U.S. Appl. No. 11/365,113, Office Action from the United States Patent and Trademark Office mailed Dec. 7, 2010.
Shaffer et al., U.S. Appl. No. 11/365,113, Office Action from the U.S. Patent and Trademark Office mailed May 5, 2011, May 19, 2011.
The Third Office Action from the Patent Office of the People's Republic of China; for Application No. 200680014772.4, Mar. 23, 2011.

\* cited by examiner

US 8,045,998 B2

METHOD AND SYSTEM FOR COMMUNICATING USING POSITION INFORMATION

TECHNICAL FIELD OF THE INVENTION

This invention relates in general to communication systems and, more particularly, to a method and system for communicating using position information.

BACKGROUND OF THE INVENTION

Many security and safety personnel, such as police, fire fighters and ambulance drivers use radio systems for communication. Radio frequencies are allocated based on the agency to which the safety and security team belongs and on their geographical location. For example, the Palo Alto police department may use one set of radio frequencies while the San Jose police department may utilize a different set of frequencies. This method allows each team to use their radio to broadcast communications to their own team without overwhelming a neighboring team with information which may not be relevant for their operations. In addition, this method enables the reuse of the limited frequency bands for communication by other teams.

Statewide agencies like the California Highway Patrol (CHP) or nationwide agencies like the Federal Bureau of Investigation (FBI) may need to communicate with local safety and security agencies as part of their normal operations. For example, if the CHP needs to chase a car on highway a certain highway, they may need to coordinate the event with the local agencies along the chase path. Some systems rely on a centrally located dispatch to coordinate communication with local agencies. Some systems rely on a handbook of frequencies for different agencies at a variety of locations. In addition, some safety and security personnel utilize frequency scanners to locate the set of frequencies utilized in specific geographical locations. Many communications over such frequencies are increasingly becoming encrypted.

SUMMARY OF THE INVENTION

The present invention provides a method and system for communicating using position information that substantially eliminates or reduces at least some of the disadvantages and problems associated with previous methods and systems.

In accordance with a particular embodiment, a method for communicating using position information includes communicating on a first communication network at a first location using one or more first communication parameters of the first communication network and, upon moving from the first location to a second location, receiving position information identifying the second location. The method includes adjusting the one or more first communication parameters to one or more second communication parameters based on the second location and communicating on a second communication network at the second location using the one or more second communication parameters.

The first and second communication parameters may comprise a frequency, a modulation method and/or an encryption key. The communication networks may comprise safety and security agency networks of the first and second locations. Adjusting the one or more first communication parameters to one or more second communication parameters based on the second location may comprise automatically adjusting the one or more first communication parameters to one or more second communication parameters based on the move to the second location, adjusting the one or more first communication parameters to one or more second communication parameters in response to a user command or adjusting the one or more first communication parameters to one or more second communication parameters based on predefined user instructions.

In accordance with another embodiment, a system for communicating using position information includes a processor operable to communicate on a first communication network at a first location using one or more first communication parameters of the first communication network. The system includes a receiver coupled to the processor and operable to, upon moving from the first location to a second location, receive position information identifying the second location. The processor is also operable to adjust the one or more first communication parameters to one or more second communication parameters based on the second location and communicate on a second communication network at the second location using the one or more second communication parameters.

Technical advantages of particular embodiments include providing a mobile endpoint user the ability to communicate, while changing locations, with different communication networks that utilize different communication parameters, such as different radio frequencies, modulation methods and/or encryption keys. As a user moves locations, GPS information may be used to recognize a new location. A user's endpoint may then, either automatically, through specific user command or predefined instructions, alter its communication parameters so that the user may communicate on one or more local or other networks that correspond to the user's location. Accordingly, effort and time associated with determining appropriate communication parameters when moving to a new location are reduced.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
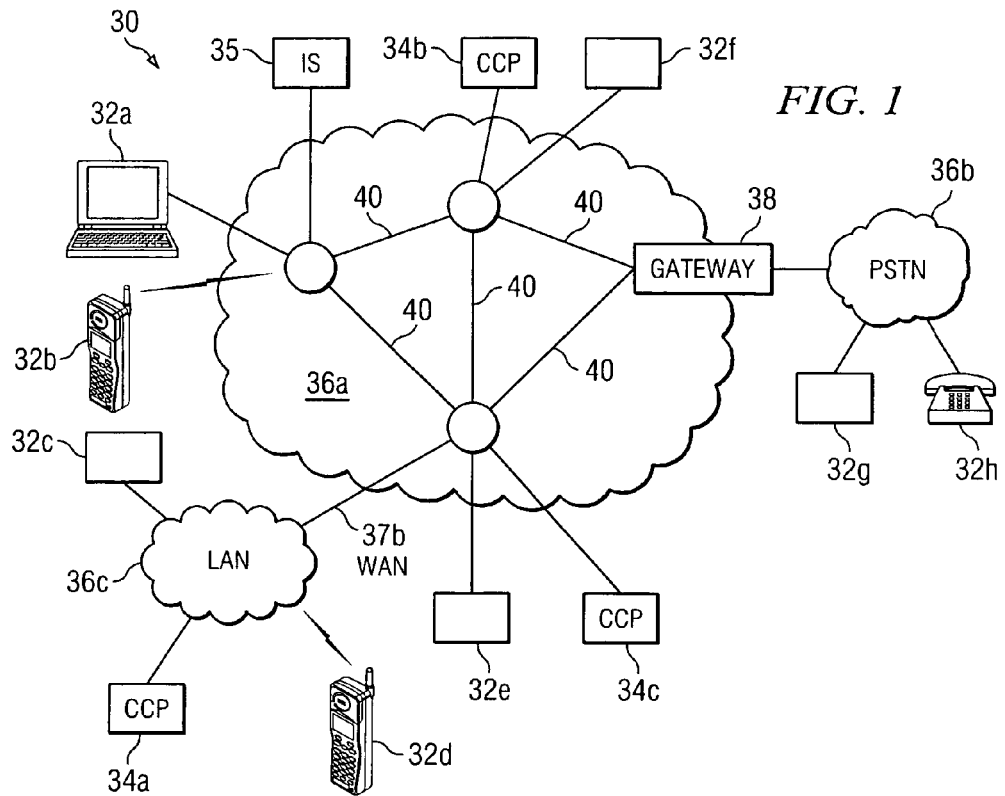
FIG. 1 illustrates a communication system including a plurality of endpoints operable to communicate among each other, in accordance with a particular embodiment.

FIG. 1 illustrates a communication system 30 including a plurality of endpoints 32a-32h having the ability to establish communication sessions between each other and/or communication control posts (CCPs) 34a-34c and interoperability system (IS) 35 using one or more of communication networks 36a-36c. In particular embodiments, at least some of endpoints 32 comprise mobile devices capable of communicating with other endpoints and devices through any of a variety of communication parameters, such as radio frequencies modulation methods and encryption keys. As discussed in further detail below, CCPs 34 aid in providing communication parameters to mobile endpoints as system configurations require, and IS 35 facilitates interoperability between endpoints and devices of various communication networks.

Particular embodiments provide a mobile endpoint user the ability to communicate, while changing locations, with different communication networks that utilize different communication parameters, such as different radio frequencies, modulation methods and/or encryption keys. As a user moves locations, GPS information may be used to recognize a new location. A user's endpoint may then, either automatically, through specific user command or predefined instructions, alter its communication parameters so that the user may communicate on one or more local or other networks that correspond to the user's location.

In the illustrated embodiment, communication network 36a enables communication between a plurality of endpoints 32a-32g, CCPs 34a-34c and IS 35 distributed across multiple cities and geographic regions. Communication network 36b may comprise a public switched telephone network (PSTN) that couples endpoints 32g and 32h with communication network 36a through gateway 38. Communication network 36c is a local area network (LAN), which couples endpoints 32c and 32d and CCP 34a with communication network 36a. Accordingly, users of endpoints 32a-32h, CCPs 34a-34c and IS 35 can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples communication networks 36a and 36c.

Communication network 36a includes a plurality of segments 40 and nodes 41 that couple endpoints 32a, 32b, 32e and 32f with CCP 34b and IS 35, gateway 38 and communication networks 36b-36c. Therefore, a user of endpoint 32a is provided with access to endpoints 32b-32h, and CCPs 34a-34c. Nodes 41 may include any combination of network components, gatekeepers, call managers, conference bridges, routers, hubs, switches, gateways, base stations, endpoints or other hardware, software or embedded logic implementing any number of communication protocols that allow for the exchange of data in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages. Any one of networks 36a-36c may be implemented as a local area network (LAN), wide area network (WAN), cellular network, global distributed network such as the Internet, Intranet, Extranet, or any other form of wireless or wireline communication network. Communication network 36a may include any number and combination of segments 40, nodes 41, endpoints 32, CCPs 34 and/or ISs 35.

Communications over communication networks 36a-36c may use any suitable communication protocol. In a particular embodiment, communication network 36a employs voice communication protocols that allow for the addressing or identification of endpoints, nodes, and/or other components coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks, for example through the use of interfaces or components. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 32d, CCPs 34 and gateway 38 may be IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32h, CCPs 34a-34s and/or gateway 38 may be any combination of hardware, software, logic embodied in a non-transitory computer readable medium, and/or encoded logic that provides communication services to a user. For example, endpoints 32a-32h may include a telephone, a personal computer (PC), a video monitor, a camera, an IP phone, a cell phone, a land mobile radio (LMR), a personal digital assistant (PDA), a command center or any other communication hardware, software and/or encoded logic that supports the communication of audio, video or other data, using packets of media (or frames) or otherwise, using communication network 36a. Endpoints 32a-32h may also include unattended or automated systems, gateways, other intermediate components or other devices that can establish media sessions. Although FIG. 1 illustrates a particular number and configuration of endpoints, CCPs, an IS, segments, nodes, and gateways, communication system 30 contemplates any number or arrangement of such components for communicating media.

Figure 2:
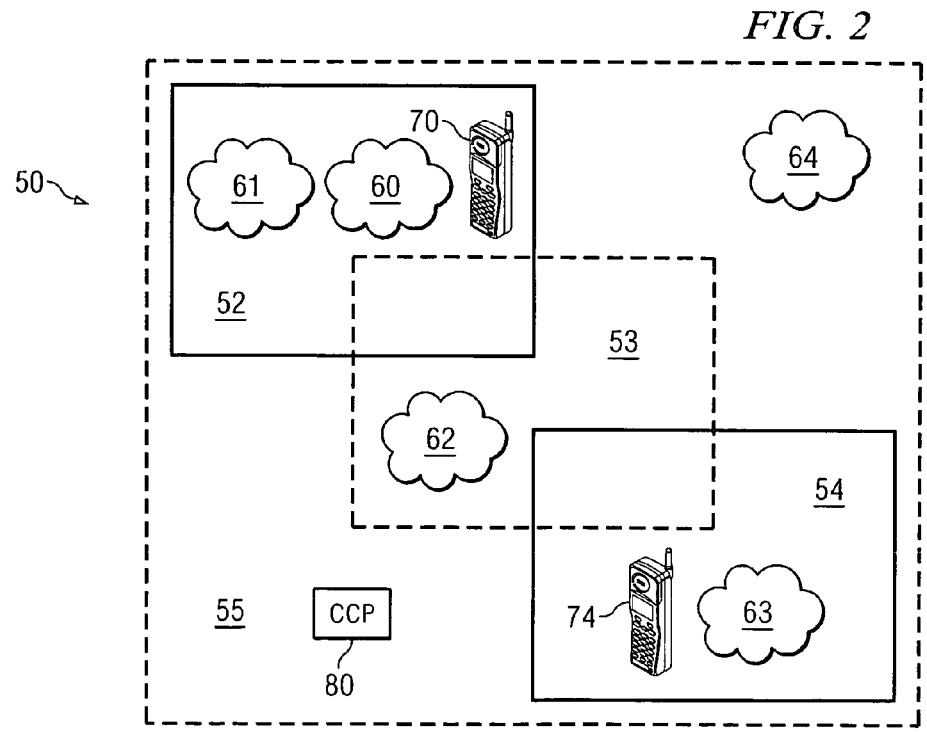
FIG. 2 illustrates a system for communicating using position information, in accordance with a particular embodiment.

FIG. 2 illustrates a communication system 50 for communicating using position information, in accordance with a particular embodiment. Communication system 50 includes a plurality of geographic regions 52-55, communication networks 60-64, endpoints 70 and 74 and CCP 80.

In particular embodiments, geographic regions 52-55 may correspond to buildings, campuses, municipalities, counties, states, countries or any other particular geographical area. As illustrated, geographic area 52 includes communication networks 60 and 61 that communicate information in area 52; geographic area 53 includes communication network 62 that communicates information in area 53; geographic area 54 includes communication network 63 that communicates information in area 54; and geographic area 55 includes communication network 64 that communicates information in area 55. Communication networks 60-64 each may communicate information (e.g., signals, data or messages) over assigned radio frequencies, modulation methods and/or various encryption keys to support communication among network communication devices. In particular embodiments, each communication network 60-64 may support communication among communication endpoints of one or more groups, such as safety and security agencies and other public or private organizations. For example, various groups may have their own communication networks that utilize particular communication parameters. Communication endpoints and devices of these networks may comprise any suitable communication components, such as land mobile radios. Communication networks 60-64 may comprise any number and combination of segments, nodes and endpoints to enable communication among network devices and components and may be similar to other communication networks described herein.

In some cases, some of communication networks 60-64 may support communication on the same or overlapping frequency bands, while in some cases some of communication networks 60-64 may support communication on different frequency bands. For example, geographic region 52 may comprise a particular municipality, and communication networks 60 and 61 may support communications for a police department and a fire department, respectively, of the municipality. In some cases, the police department network and the fire department network may communicate on different frequencies to ensure that devices on one such network do not receive irrelevant information from devices on the other network. In addition, communication networks 60 and 61 may use distinct encryption protocols or methods (e.g., distinct encryption keys) to provide secure communications within the respective networks.

As another example, geographic areas 52 and 54 may comprise separate municipalities proximate to each other, and communication networks 60 and 63 may support communications for respective police departments of the municipalities on different frequencies and using different modulation methods and encryption keys. In this example, geographic area 53 may comprise a particular county that overlaps with municipalities 52 and 54. Geographic area 55 may comprise a particular state or country that includes geographic areas 52-54 and communication network 64. For example, communication network 64 may support communications for a state police agency, such as a state highway patrol, or a national agency, such as the FBI, on different frequencies than those used for communication networks 60-63.

As indicated above, geographic areas may be defined using any suitable criteria. As an additional example, geographic areas 52 and 54 may comprise separate companies' facilities that each use respective communication networks (e.g., communication networks 60 and 63, respectively) to provide communications among their endpoints using separate frequencies, modulation methods or encryption keys.

In accordance with particular embodiments, frequencies, modulation methods and/or encryption keys utilized by the various communication networks 60-64 may be embedded in memory of mobile endpoints. For example, as mobile endpoint 70 (e.g., a LMR in a safety vehicle) moves between geographic areas, the endpoint may use GPS information to pin-point its location and automatically adjust its current communication radio frequency, modulation method and/or encryption key settings to allow the user of the endpoint to communicate with local safety and security forces in the area in which the endpoint is currently located. For example, mobile endpoint 70 may be currently located in geographic area 52 and may be communicating on communication network 60 (e.g., with other mobile endpoints, control centers or other communication devices) on a radio frequency X using encryption key J used by communication network 60. Safety and security personnel associated with a vehicle in which mobile endpoint 70 is used (e.g., a police officer) may need to drive to geographic area 54 and communicate on communication network 63 with users of that communication network (e.g., a police department network of a municipality 54). However, communication network 63 may support communications using a different frequency and encryption key, for example radio frequency Z and encryption key L. This information regarding particular radio frequencies and encryption protocols used by various communication networks may be stored in a memory of mobile endpoint 70. As mobile endpoint 70 enters geographic area 54, it recognizes is location through, for example, GPS technology, and adjusts its communication settings (e.g., radio frequency and encryption key) to allow for communication with other devices of communication network 63.

In some cases the endpoint may be set to automatically switch communication settings upon such a move once the endpoint enters an area of a different or particular communication network. In some cases such a switch may occur through a user interface, such as a user pressing a button to enable the switch. For example, specific buttons may be used to switch communication settings. In some embodiments, each network for which communication settings are stored may have its own switch command or button (e.g., "City A Police," "City A Fire," "City B Police," etc.) that may be operable when in the network's geographic area. In some cases, buttons used to switch may be generically mapped to a local area in which the endpoint is present (e.g., "local fire," "local police," "state police," etc.). The present invention contemplates great flexibility in using various interfaces to switch communication settings of an endpoint.

As another example, a user of mobile endpoint 70 may be communicating on communication network 64 of geographic area 55 using that communication network's respective frequency, modulation method and encryption key. As mobile endpoint 70 moves into local geographic area 54 (located within geographic area 55), the user may still desire to communicate on communication network 64. However, through GPS information, mobile endpoint 70 will still recognize the move into geographic area 54. If the user of mobile endpoint 70 desires to communicate on locally-specific communication network 63, the user may press a button, such as a local network button. Mobile endpoint 70 will recognize its location and switch its communication settings (e.g., frequency, modulation method and/or encryption key) to those of the communication network 63. The switching of communication settings using positioning information (e.g., GPS technology) to allow communication on the new settings may be implemented in any suitable manner, such as pressing a button, voice activation or predefined rules or instructions. For example, in some cases a mobile endpoint user may set the endpoint to switch endpoint communication settings upon entering certain networks but not to switch communication settings upon entering other networks.

In another example, an officer, such as a state highway patrol officer, may be provided with a PC with a touch screen. The PC comprises a mobile endpoint. Icons on the touch screen may provide the officer the ability to join communication sessions with local safety and security forces (e.g., firefighters, police, etc.) as the officer's vehicle moves between communication domains. The officer may be provided with a plurality of options for communication (e.g., various communication networks and/or groups of endpoints) based on his location. Upon receiving instructions from the officer, communication parameters used by the endpoint may be automatically adjusted based on the officer's current location.

In some embodiments, frequencies, modulation methods and encryption keys utilized by various communication networks (e.g., communication networks of various groups or agencies) may be kept in a centralized communication and control post. For example, CCP 80 may include mappings of various communication settings and communication networks via location and may be located at any suitable location. As a mobile endpoint (e.g., mobile endpoint 74 in a safety vehicle) moves between geographic areas (e.g., from geographic area 54 to geographic area 52), the endpoint sends its GPS information to CCP 80. CCP 80 may authenticate the mobile station and/or its user using any suitable information transmitted with or separate from the GPS information. Upon successful authentication, CCP 80 determines that the vehicle has moved to a new communication region (e.g., geographical area 52) and instructs endpoint 74 to adjust its frequencies, modulation methods and encryption keys to match parameters of one or more communication networks of the geographical area (e.g., parameters of communication network 61). In particular embodiments, communication between CCP 80 and mobile endpoint 74 may be performed automatically without human intervention resulting in automatic adjustment of the frequencies, modulation methods and encryption keys. This allows a user of the endpoint, such as a mobile officer, to automatically connect with network devices of a communication network (e.g., local safety and security forces) once the user enters the network's area. In some cases one or more interface actions, such as the pressing of a key stroke, and/or predefined instructions may be used to adjust endpoint communication settings transmitted by CCP 80 based on location information to allow communication between mobile endpoint 74 and devices of a communication network as the endpoint moves into the network's area.

In some embodiments, a user may be given the option of contacting local agency networks. In some embodiments, the endpoint may store in memory the communication parameters of the previous communication region. The user may be given the option to connect with either the local agencies or with the agencies from the previous communication region. In yet another embodiment, for the sake of continuity the user may mark a specific frequency and or multicast address with the associated encryption keys. This feature may be used to facilitate quick communication with specific people from a given agency who were involved in the early phase of the specific event. In some embodiments, the system notifies the user as he moves between communication regions. The notification of a move between communication regions may include automatically converting position information, such as GPS information, to location information of a particular region (e.g., county or city) to which the user has moved such that, in particular embodiments, the name of the new region and/or networks may be announced to the user (e.g., "You have moved from City A to City B").

Figure 3:
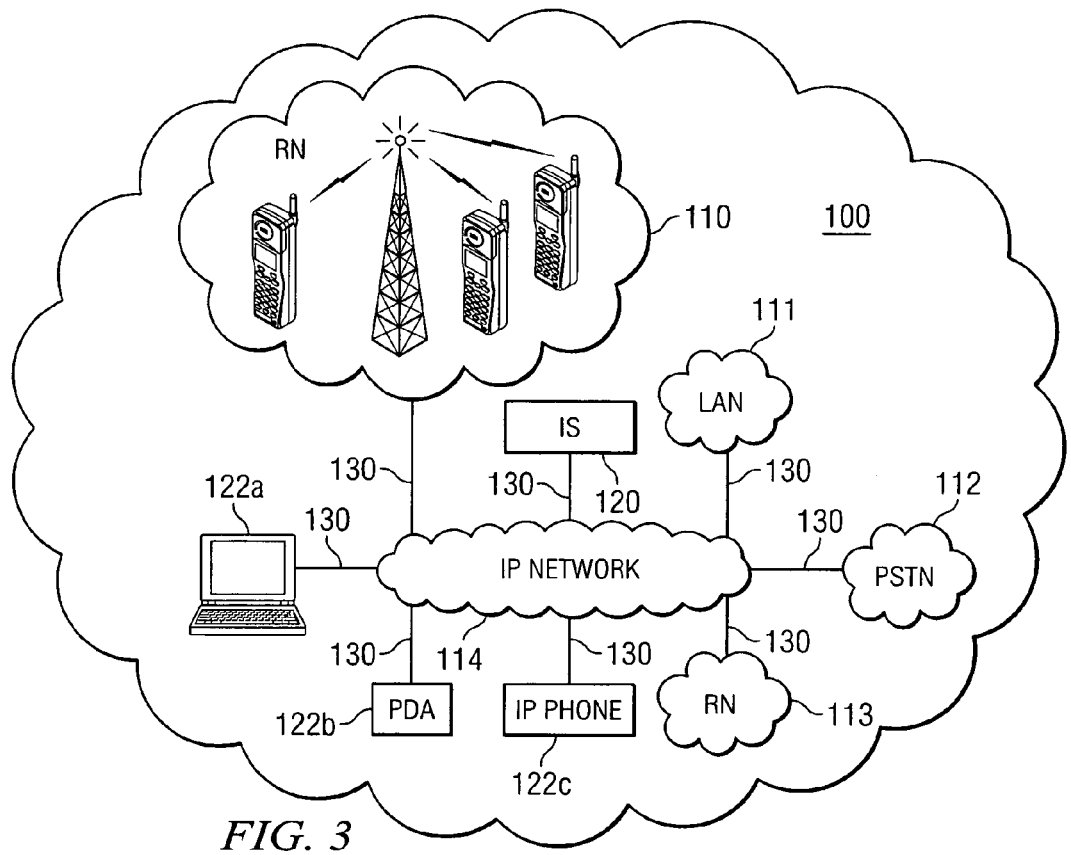
FIG. 3 illustrates a communication system having an interoperability system, in accordance with a particular embodiment.

FIG. 3 illustrates a communication system 100, in accordance with a particular embodiment. Communication system 100 includes communication networks 110-114, interoperability system (IS) 120 and endpoints 122. In the illustrated embodiment, communication network 110 comprises a radio or wireless network, communication network 111 comprises a LAN, communication network 112 comprises a PSTN, communication network 113 comprises a radio network and communication network 114 comprises an IP network. It should be understood, however, that communication system 100 may comprise any number of IP or non-IP communication networks of any wireless or wireline form capable of communicating audio and/or video telecommunication signals, data, and/or messages, including signals, data or messages. Communication networks 110-114 may comprise any number and combination of segments, nodes and endpoints to enable communication among network devices and components. A radio network may support communication among portable mobile station endpoints, such as land mobile radios (LMRs), using any suitable communication methods or features, such as cellular and push-to-talk (PTT). Communication networks 110-113 may comprise networks of particular groups or agencies (e.g., a municipality's police department network), whether operational with respect to a particular area or otherwise. In the illustrated embodiment, endpoints 122 comprise a PC (endpoint 122a), a PDA (endpoint 122b) and an IP phone 122c). However, as indicated above, IS 120 may be configured to communicate with any type of communication endpoint. Segments 130, which may comprise any suitable wireless or wireline communication links, including one or more communication networks (e.g., WANS) as appropriate, coupled various networks with each other and with endpoints 122 and IS 120. In particular embodiments, segments may include gateways for facilitating communication between various networks, such as an LMR gateway between radio network 110 and IP network 114. In particular embodiments, communication system 100 may include similar components and networks as described with respect to communication systems 10 and 50 of FIGS. 1 and 2, respectively.

IS 120 enables, facilitates and/or provides for interoperable communication among communication endpoints and devices, such as LMRs, cellular phones, IP phones, PCs, PDAs, PSTN phones, video monitors, cameras, sensors and CCPs of one or more communication networks (e.g., communication networks 110-113) using Internet Protocol. In particular embodiments, IS 120 may control gateways (for example, of segments 130) in order to map radio frequencies of particular mobile radio endpoints to IP addresses for communication to other types of radio endpoints or IP devices. In some embodiments, IS 120 may host audio conferences that bridge communications received from endpoints. As indicated, communication system 100 (including IS 120) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 120 is coupled to communication networks 110-113 and endpoints 122 through IP network 114, which may comprise any suitable IP network.

As indicated above, IS 120 uses IP to enable communication among endpoints of various networks. For example, IS 120 may communicate with endpoints using multicast IP addresses assigned to an endpoint of a communication network, a group of endpoints of a communication network or one or more endpoints of multiple communication networks or alternatively using a peer to peer dialed connection. For example, a group of endpoints may be combined into a virtual talk group for communication using a particular IP address. The use of multicast IP addresses allows communication devices and endpoints of various communication networks to communicate with each other through IS 120 to provide network interoperability.

The multicast IP addresses can be used to enable IS 120 to provide the functionality described above with respect to communication system 50 of FIG. 2. In accordance with some embodiments, multicast IP addresses, radio frequencies, modulation methods and encryption keys utilized by various networks (e.g., agencies) may be embedded in memory of the mobile endpoint. The multicast addresses in the IS 120 are mapped into a set of communication radio frequencies that are used by the networks (e.g., local safety and security agencies). As the mobile endpoint (e.g., in a safety vehicle) moves between communication regions, the endpoint uses GPS information to pinpoint its location and automatically adjusts communication parameters (e.g., IP addresses, radio frequencies, modulation methods and encryption keys) to achieve interoperability. This allows the mobile endpoint user to connect with local safety and security forces manually with, for example, a single key stroke or automatically based on pre-determined collaboration polices maintained in the mobile endpoint.

Figure 4:
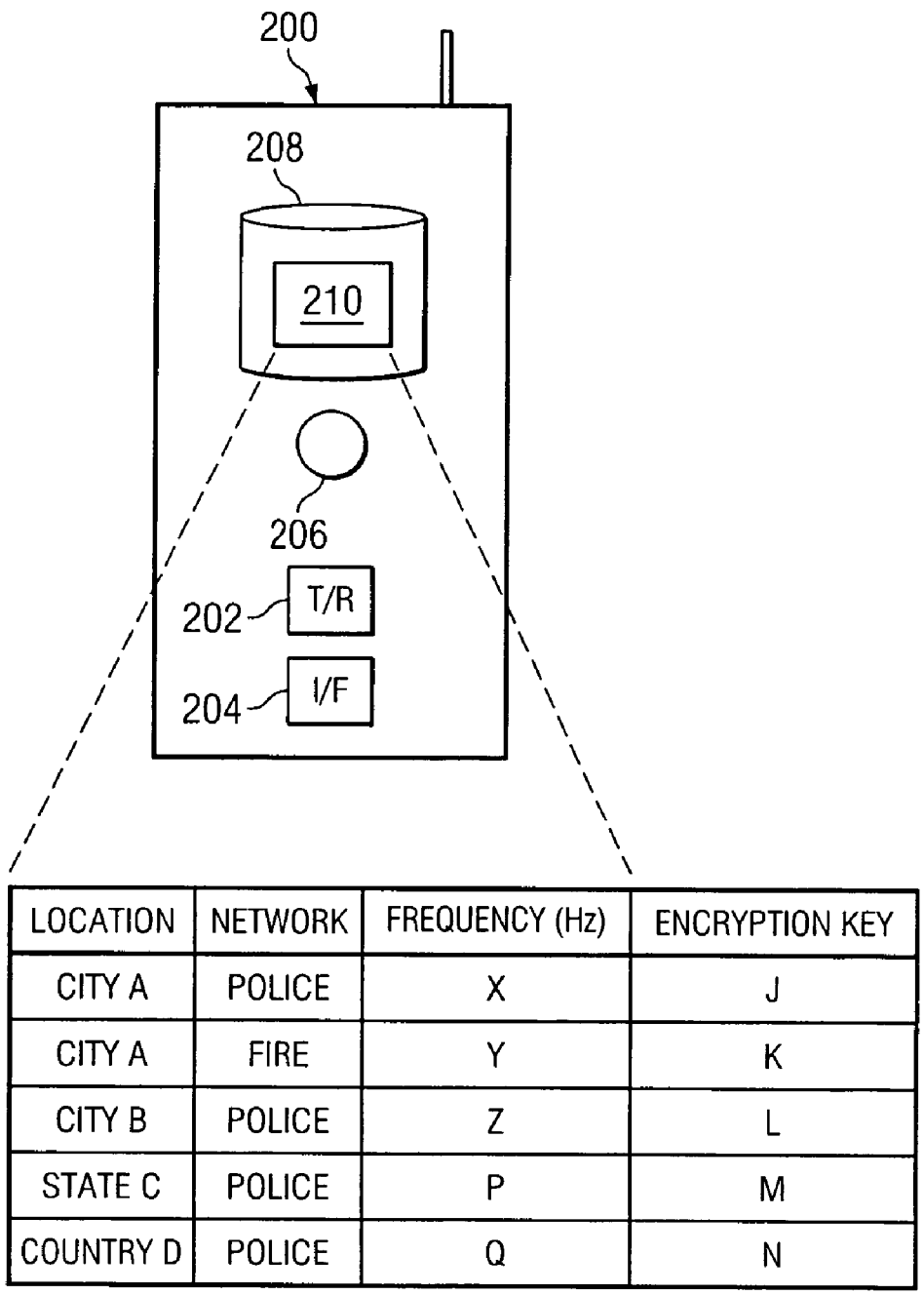
FIG. 4 illustrates an example mobile endpoint, in accordance with a particular embodiment.

In some embodiments, IS 120 may act in a similar manners as CCPs of FIGS. 1, 2 and 4. For example, multicast addresses, radio frequencies, modulation methods and encryption keys utilized by various agencies may be kept with IS 120 as a centralized communication and control post. The multicast addresses may be mapped into a set of communication radio frequencies, modulation methods and/or encryption keys that are used by local safety and security agencies. As a mobile endpoint moves between communication regions, the endpoint may periodically send its GPS information to IS 120. Upon successful authentication of the endpoint, IS 120 may determine that the endpoint has moved to a new communication region and may instruct the endpoint to adjust its multicast addresses, radio frequencies, modulation methods and/or encryption keys to match the new communication region's parameters.

Therefore, as discussed above, the present invention contemplates embodiments that can apply to both IP and non-IP mobile endpoints and communication networks. Communication between a CCP and mobile endpoints may occur without any human intervention resulting in automatic adjustment of the frequencies, modulation methods, encryption keys and IP addresses. This allows a mobile officer to connect with local safety and security forces with a single key stroke.

FIG. 4 illustrates a mobile endpoint 200, in accordance with a particular embodiment. Mobile endpoint 200 may be similar to and provide similar functionality to other endpoints described herein, such as endpoints 70 and 74 of FIG. 2.

In the illustrated embodiment, endpoint 200 includes a transmitter/receiver 202, a user interface 204, a processor 206 and a memory module 208. Transmitter/receiver 202 obtains signals from GPS satellites or ground stations of a communication network in order to determine a position of endpoint 200 and receives and transmits voice and other data between endpoint 200 and other network devices and components. User interface 204 provides a mechanism through which a user of mobile endpoint 200 may operate the endpoint and communicate with other network devices. For example, through interface 204 a user may input instructions regarding adjustment of the endpoint's communication settings (e.g., radio frequency, modulation method and encryption key) upon entering a new communication network. Interface 204 may comprise a keypad, display, touch screen, audio input or any other suitable interface. Instructions may be submitted through speech recognition, collection of keystrokes, soft key or otherwise.

Processor 206 may be a microprocessor, controller, or any other suitable computing device, resource, or combination of hardware, software and/or encoded logic operable to perform endpoint functionality. Processor 206, either alone or in conjunction with other endpoint components, provides endpoint functionality discussed herein. Memory module 208 may be any form of volatile or non-volatile memory including, without limitation, magnetic media, optical media, random access memory (RAM), read-only memory (ROM), removable media, or any other suitable local or remote memory component.

In the illustrated embodiment, memory module 208 includes network communication parameter listings 210 which contains mappings of communication settings, such as radio frequencies and encryption keys, of communication networks by location. As indicated above, locations of communication networks may be defined in any suitable manner, such as by latitude/longitude coordinates, buildings, campuses, cities, counties, states, countries or any other particular geographical area. The illustrated embodiment includes city A, city B, state C and country D. The locations may be stored in memory module 208 with GPS coordinates so that upon receiving GPS coordinates via transmitter/receiver 202, endpoint 200 will know within which location(s) the endpoint is currently positioned. Also stored in parameter listings 210 are various communication networks corresponding to the locations, such as police and fire. Any suitable communication networks may be identified stored as corresponding to a location. Stored with the communication networks are frequencies and encryption keys utilized by those networks. The stored frequencies may correspond to one or more frequency ranges utilized by a network, and the stored encryption key may correspond to any suitable encryption method utilized by the network. For example, the police network of city A communicates on frequency X and uses encryption key J.

Communication parameter listings 210 are accessed in various embodiments to provide communication system functionality as described above. For example, as an endpoint moves into a new location, it may recognize the new location through GPS technology and automatically adjust its communication settings (e.g., radio frequency and/or encryption key) to allow its user to communicate on a communication network of the location.

It will be recognized by those of ordinary skill in the art that mobile endpoints, CCPs and interoperability systems disclosed herein are merely example configurations in accordance with particular embodiments. These systems may include any number of interfaces, processors, memory modules, and other components to accomplish the functionality and features described herein. In addition, these components and other desired components for performing the above described functionality may be centrally located (local) with respect to one another, or distributed throughout communication systems 30, 50 and 100. In addition, one or more components of these systems and devices may work together in performing various functionalities described herein.

Figure 5:
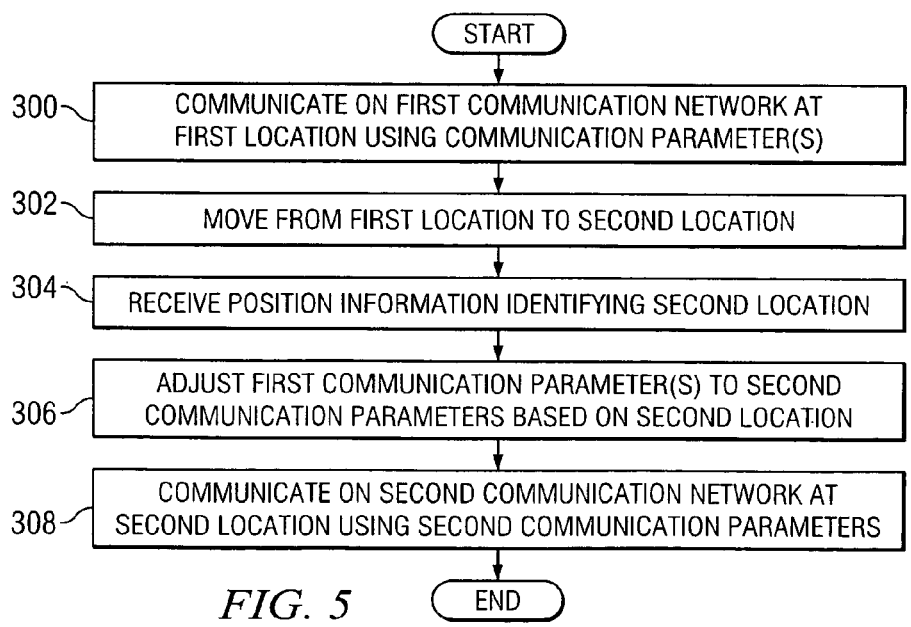
FIG. 5 illustrates a method for communicating using position information, in accordance with a particular embodiment.

FIG. 5 is a flowchart illustrating a method for communicating using position information, in accordance with a particular embodiment. At step 300, one or more communication parameters are used to communicate on a first communication network at a first location. The communication parameters may comprise a radio frequency, modulation method and/or an encryption key of the first communication network. As an example, an officer may be communicating on a police network using a PC in the officer's vehicle. At step 302, the officer moves from the first location to a second location. At step 304, position information, such as GPS information, is received identifying the second location. The second location may comprise, for example, a city or area away from a city or area of the first location.

At step 306, the first communication parameter(s) are adjusted to second communication parameter(s) based on the second location. This may include "replacing" the first communication parameter(s) with the second communication parameter(s) based on the second location. The second communication parameters may be stored at the communicating endpoint and may be based on one or more communication networks of the second location, such as a police network of the second location. Such adjustment may occur automatically as the user moves to the second location, in response to a user interface action, such as one or more key strokes or a voice command, or according to predefined rules or instructions. At step 308, the second communication parameters (e.g., radio frequency, modulation method and/or encryption key of the second communication network) are used to communicate on the second communication network at the second location.

Some of the steps illustrated in FIG. 5 may be combined, modified or deleted where appropriate, and additional steps may also be added to the flowchart. Additionally, steps may be performed in any suitable order without departing from the scope of the invention.

As indicated above, technical advantages of particular embodiments of the present invention include utilizing GPS information to adjust parameters of a mobile endpoint and automatically tune its parameters to match local network requirements. Particular embodiments automatically modify the frequencies of the mobile endpoint to match those of local agencies. Systems support multiple radio networks, with roaming, for seamless access. Particular embodiments automatically modify multicast addresses of a mobile communication system which may be mapped to frequencies of local agency networks. Embodiments also modify, modulation methods and encryption keys of a mobile communication system to match those of the local agencies.

In some embodiments, audible indication is provided to the mobile endpoint user regarding changing parameters, informing him that the specific local agency key will connect him to a different district. The system may automatically announce the name of the communication region as the user's mobile endpoint moves between communication regions. Some embodiments provide a means of marking a specific frequency and/or multicast address for future communications. Various embodiments reduce the manual setup of communication parameters allowing security forces to focus on serving the public rather than on manually fine tuning their communication system. In addition, organizational polices for collaboration can be applied to determine and meet the levels of interoperability.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication systems 30, 50 and 100 and endpoint 200, these elements may be combined, rearranged or positioned in order to accommodate particular routing architectures or needs. In addition, any of these elements may be provided as separate external components to communication systems 30, 50 and 100 and endpoint 200 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for communicating using position information, comprising:
communicating on a first communication network at a first location using one or more first communication parameters of the first communication network, the one or more first communication parameters of the first communication network comprising a first encryption key of the first communication network;
upon moving from the first location to a second location, receiving position information identifying the second location;
automatically adjusting the one or more first communication parameters to one or more second communication parameters of a second communication network based on the move to the second location based on the received position information, the one or more second communication parameters of the second communication network comprising a second encryption key of the second communication network; and
communicating on the second communication network at the second location using the encryption key of the second communication network.

2. The method of claim 1, wherein:
the one or more first communication parameters of the first communication network comprise a first frequency of the first communication network; and
the one or more second communication parameters of the second communication network comprise a second frequency of the second communication network.

3. The method of claim 1, wherein:
the one or more first communication parameters of the first communication network comprise a first modulation method of the first communication network; and
the one or more second communication parameters of the second communication network comprise a second modulation method of the second communication network.

4. The method of claim 1, wherein:
the first communication network comprises a safety and security agency network of the first location; and
the second communication network comprises a safety and security agency network of the second location.

5. The method of claim 1, wherein adjusting the one or more first communication parameters to one or more second communication parameters based on the second location comprises automatically adjusting the one or more first communication parameters to one or more second communication parameters based on the move to the second location.

6. The method of claim 1, wherein adjusting the one or more first communication parameters to one or more second communication parameters based on the second location comprises adjusting the one or more first communication parameters to one or more second communication parameters based on predefined user instructions.

7. The method of claim 1, further comprising:
notifying a user of the move from the first location to the second location;
prompting the user with an option to adjust the one or more first communication parameters in response to the move; and
wherein adjusting the one or more first communication parameters to one or more second communication parameters based on the second location comprises adjusting the one or more first communication parameters to one or more second communication parameters in response to a user command.

8. The method of claim 7, wherein the user command comprises pressing a button specific to the second communication network.

9. The method of claim 7, wherein the user command comprises pressing a button associated with a local network of the second location.

10. The method of claim 1, wherein:
the one or more first communication parameters of the first communication network comprise a first encryption key of the first communication network; and
the one or more second communication parameters of the second communication network comprise a second encryption key of the second communication network.

11. A system for communicating using position information, comprising:
a processor operable to communicate on a first communication network at a first location using one or more first communication parameters of the first communication network, the one or more first communication parameters of the first communication network comprising a first encryption key of the first communication network;
a receiver coupled to the processor, the receiver operable to, upon moving from the first location to a second location, receive position information identifying the second location;
the processor operable to:
automatically adjust the one or more first communication parameters to one or more second communication parameters of a second communication network based on the move to the second location based on the received position information, the one or more second communication parameters of the second communication network comprising a second encryption key of the second communication network; and
communicate on the second communication network at the second location using the encryption key of the second communication network.

12. The system of claim 11, wherein:
the one or more first communication parameters of the first communication network comprise a first frequency of the first communication network; and
the one or more second communication parameters of the second communication network comprise a second frequency of the second communication network.

13. The system of claim 11, wherein:
the one or more first communication parameters of the first communication network comprise a first modulation method of the first communication network; and
the one or more second communication parameters of the second communication network comprise a second modulation method of the second communication network.

14. The system of claim 11, wherein:
the first communication network comprises a safety and security agency network of the first location; and
the second communication network comprises a safety and security agency network of the second location.

15. The system of claim 11, wherein a processor operable to adjust the one or more first communication parameters to one or more second communication parameters based on the second location comprises a processor operable to automatically adjust the one or more first communication parameters to one or more second communication parameters based on the move to the second location.

16. The system of claim 11, wherein a processor operable to adjust the one or more first communication parameters to one or more second communication parameters based on the second location comprises a processor operable to adjust the one or more first communication parameters to one or more second communication parameters based on predefined user instructions.

17. The system of claim 11, wherein the processor is further operable to:
notify a user of the move from the first location to the second location;
prompt the user with an option to adjust the one or more first communication parameters in response to the move; and
wherein a processor operable to adjust the one or more first communication parameters to one or more second communication parameters based on the second location comprises a processor operable to adjust the one or more first communication parameters to one or more second communication parameters in response to a user command.

18. The system of claim 17, wherein the user command comprises pressing a button specific to the second communication network.

19. The system of claim 17, wherein the user command comprises pressing a button associated with a local network of the second location.

20. A system for communicating using position information, comprising:
means for communicating on a first communication network at a first location using one or more first communication parameters of the first communication network, the one or more first communication parameters of the first communication network comprising a first encryption key of the first communication network;
means for, upon moving from the first location to a second location, receiving position information identifying the second location;
means for automatically adjusting the one or more first communication parameters to one or more second communication parameters of a second communication network based on the move to the second location based on the received position information, the one or more second communication parameters of the second communication network comprising a second encryption key of the second communication network; and means for communicating on the second communication network at the second location using the encryption key of the second communication network.

21. Non-transitory computer readable medium comprising code that, when executed by a processor, is operable to:

communicate on a first communication network at a first location using one or more first communication parameters of the first communication network, the one or more first communication parameters of the first communication network comprising a first encryption key of the first communication network;

upon moving from the first location to a second location, receive position information identifying the second location;

automatically adjust the one or more first communication parameters to one or more second communication parameters of a second communication network based on the move to the second location based on the received position information, the one or more second communication parameters of the second communication network comprising a second encryption key of the second communication network; and communicate on the second communication network at the second location using the encryption key of the second communication network.

22. The non-transitory computer readable medium of claim 21, wherein:

the one or more first communication parameters of the first communication network comprise a first frequency of the first communication network; and the one or more second communication parameters of the second communication network comprise a second frequency of the second communication network.

23. The non-transitory computer readable medium of claim 21, wherein the one or more first communication parameters of the first communication network comprise a first modulation method of the first communication network; and the one or more second communication parameters of the second communication network comprise a second modulation method of the second communication network.

24. The non-transitory computer readable medium of claim 21, wherein:

the first communication network comprises a safety and security agency network of the first location; and the second communication network comprises a safety and security agency network of the second location.

25. The non-transitory computer readable medium of claim 21, wherein code operable to adjust the one or more first communication parameters to one or more second communication parameters based on the second location comprises code operable to automatically adjust the one or more first communication parameters to one or more second communication parameters based on the move to the second location.

26. The non-transitory computer readable medium of claim 21, wherein code operable to adjust the one or more first communication parameters to one or more second communication parameters based on the second location comprises code operable to adjust the one or more first communication parameters to one or more second communication parameters based on predefined user instructions.

27. The non-transitory computer readable medium of claim 21, further comprising code operable to:

notify a user of the move from the first location to the second location;

prompt the user with an option to adjust the one or more first communication parameters in response to the move; and wherein code operable to adjust the one or more first communication parameters to one or more second communication parameters based on the second location comprises code operable to adjust the one or more first communication parameters to one or more second communication parameters in response to a user command.

28. The non-transitory computer readable medium of claim 27, wherein the user command comprises pressing a button specific to the second communication network.

29. The non-transitory computer readable medium of claim 27, wherein the user command comprises pressing a button associated with a local network of the second location.

* * * * *